March 15, 1966  A. VEGH  3,240,475
LAWN DECORATION
Filed Oct. 4, 1963  2 Sheets-Sheet 1
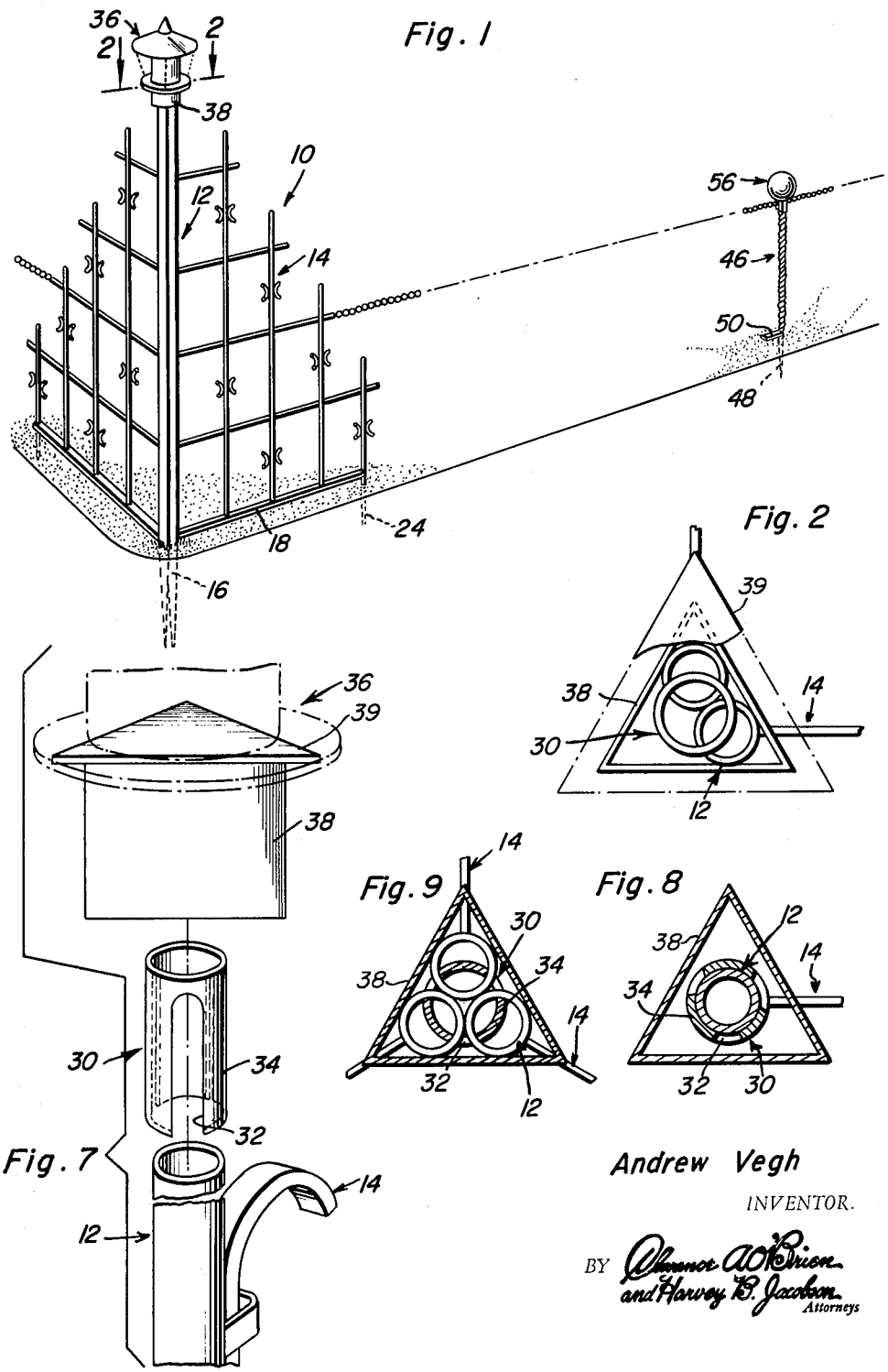
Andrew Vegh
INVENTOR.

March 15, 1966  A. VEGH  3,240,475
LAWN DECORATION
Filed Oct. 4, 1963  2 Sheets-Sheet 2
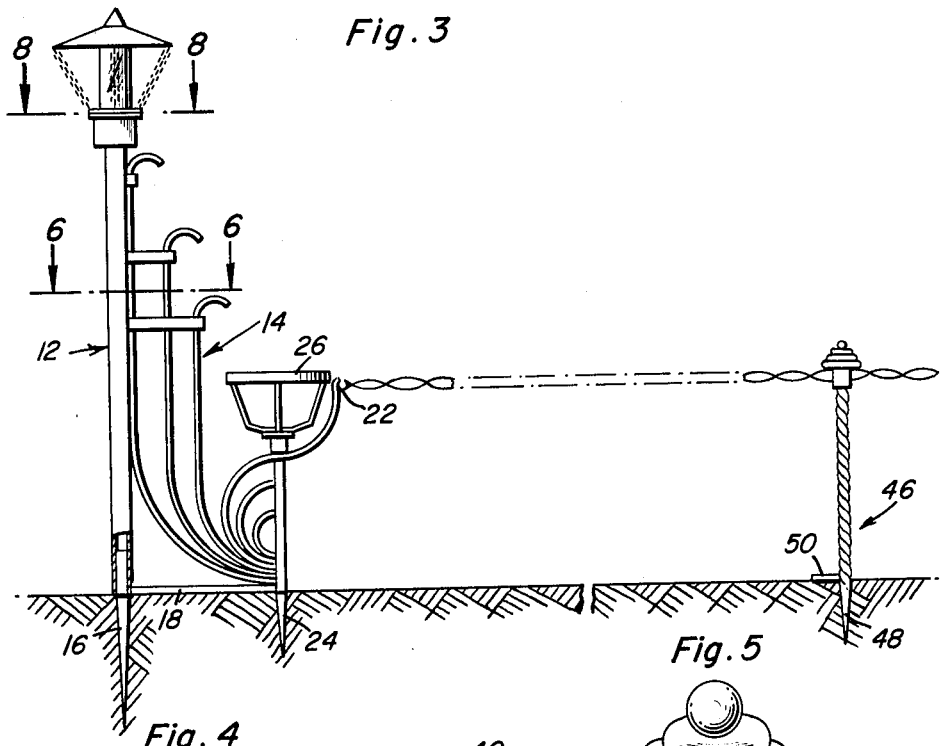
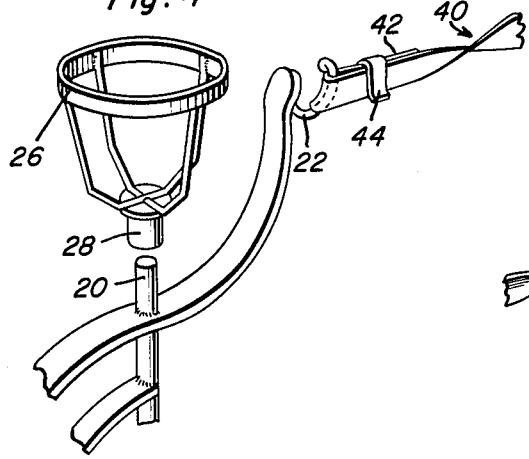
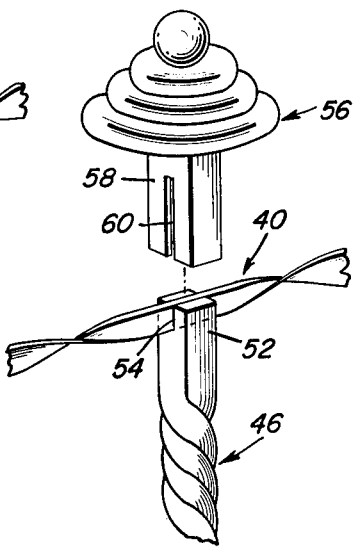
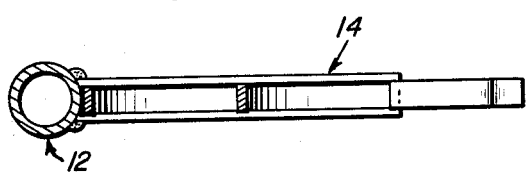
Andrew Vegh
INVENTOR.
BY *Clarence A. O'Brien*
and *Harvey B. Jacobson*
Attorneys

United States Patent Office

3,240,475
Patented Mar. 15, 1966

3,240,475
LAWN DECORATION
Andrew Vegh, 232 Heath St. W., Toronto,
Ontario, Canada
Filed Oct. 4, 1963, Ser. No. 313,980
1 Claim. (Cl. 256—27)

The instant invention is generally concerned with lawn decorations, and is more particularly directed toward a lawn decorative device including a plurality of sections adjustably interconnected for arrangement in a variety of ways so as to produce a desired effect such as for example a corner accentuating structure or a border defining means.

It is a primary object of the instant invention to provide a lawn decoration which, through specifically formed units and novel means for interconnecting the units, enables an adaptation of the basic decorative device to a plurality of different arrangements.

It is also a significant object of the instant invention to provide a means for interconnecting a plurality of standard and panel units together with the panels extending radially outward from the centrally located interlocked standards with the particular angle between the panels being variable.

In conjunction with the above object, it is also an object of the instant invention to provide means on the panels for the attachment of both functional and decorative means thereto.

Likewise, it is an object of the instant invention to provide, in addition to the aforementioned standards and panels, a plurality of relatively short posts orientated in spaced relation to each other and forwardly of the outer extremity of the panels for the retention of an elongated strip-like member capable of functioning both as a decorative means and so as to define particular areas.

Along with the above object, it is alo an object of the instant invention to provide means whereby the strip-like member can be quickly attached to and removed from both the panels and the relatively short posts.

Furthermore, it is intended that all portions of the lawn decoration of the instant invention be quickly and easily both erected and removed, this being particularly useful during, for example, the mowing of the grass.

Also, it is an object of the instant invention to provide a device wherein all of the components are both simple in construction and of a highly rigid and durable nature.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of one particular arrangement of a pair of standard and panel units illustrating the orientation of the posts relative thereto;

FIGURE 2 is an enlarged cross sectional view taken substantially on a plane passing along line 2—2 of FIG. 1 illustrating the manner in which the upper ends of the two posts are interlocked;

FIGURE 3 is an elevational view of the instant invention with a modified type of panel being used;

FIGURE 4 is an enlarged partial perspective view illustrating both the manner in which an ornamental device, in this instance a flower pot holder, is to be removably mounted on the panel, and the manner in which the decorative or boundary defining strip is engaged with the panel;

FIGURE 5 is an enlarged perspective view illustrating the manner in which the boundary strip is to be secured to the individual intermediate posts;

FIGURE 6 is an enlarged cross sectional view taken substantially on a plane passing along line 6—6 in FIGURE 3;

FIGURE 7 is an exploded perspective view of the top of one of the standards, the interlocking sleeve, and the decorative device which is secured to the sleeve;

FIGURE 8 is a cross sectional view similar to FIGURE 2 however illustrating the use of only a single standard; and FIGURE 9 is a cross sectional view similar to FIGURES 2 and 8 illustrating the manner in which three standards are to be interlocked at their upper ends.

Referring now more specifically to the drawings, reference numeral 10 is used to generally designate one of the basic units of the instant invention, this unit consisting of an elongated tubular standard 12 and a panel 14 rigidly affixed to the standard 12 and projecting outwardly therefrom.

Inasmuch as the standard 12 is to be erected, preferably temporarily, by direct engagement with the earth, a pointed earth engaging solid spike or anchor 16 is affixed, as by welding, to the lower end of the tubular standard 12.

The panel 14 which, as will be appreciated from FIGURES 1 and 3, can be of any suitable design preferably of an open lattice work nature, is to include a flat base bar 18 projecting horizontally from the lower end of the standard 12, a vertical stub 20 adjacent the outer end of the panel, and an outwardly projecting hook 22 extending outwardly from the outer end of the panel at approximately mid-height. The base bar 18 is to be positioned flush on the surface of the earth and, in addition to stabilizing the erected unit 10, also acts as a convenient means for erecting the unit 10 in that one can place his foot on this bar adjacent the standard 12 and exert a downward pressure so as to drive the anchor 16 into the earth. Further, it will of course be appreciated that the unit 10 is rotatably adjustable, and, in order to anchor the unit 10 in any of a plurality of rotatably adjusted positions, a second anchor 24 is provided at the outer end of the panel 14, this anchor 24 of course also extending downwardly below the base bar 18 and is similarly drivable into the earth by a downward pressure exerted on the base bar 18 or on the outer end of the panel as may be convenient.

The upwardly projecting stub 20 is specifically provided for either temporarily or permanently receiving any suitable decorative device such as for example a flower pot, this flower pot, not in itself being illustrated, being positionable within a suitable holder 26 which in itself includes a depending tubular member 28 engageable over the stub 20.

The instant invention contemplates the use of either one, two, or three of the units 10 radiating from a single central point defined by the standard or standards 12. Further, it is contemplated that these units, in particular the panels 14 thereof, be capable of a wide range of angular adjustment relative to each other. In order to effect the combining of two or more of the units 10, and interlocking tubular sleeve 30 is utilized, this sleeve 30 being elongated and including three relatively wide elongated slots 32 extending upwardly from the lower end thereof and terminating short of the upper end so as to form, in effect, three depending tongues 34. In interlocking the upper ends of two or more standards 12, the lower ends of these standards 12 having been engaged in the earth in a manner so as to position the standards 12 in generally abutting relation to each other, one of the tongues 34 of the sleeve 30 is inserted in the open upper end of each of the tubular standards 12 with the standard walls being received within the slots 32 in a manner which enables the angular adjustment of the panels 14 relative to each other. As will be appreciated from FIGURE 9, the slots 32 and tongues 34 are of a size so as to snugly receive the walls of two adjoining standards 12 within each slot 32, the standards 12 abutting each other within the sleeve 30. With reference to FIGURE 8, it will be noted that the sleeve 30 is to be generally of a size so as to be telescopically receivable over a single standard 12 if only one such standard is being used. This is particularly deemed desirable in that it is contemplated that the sleeve 30 have a decorative device, such as for example a lamp, bird feeder, etc., generally referred to by reference numeral 36, secured thereto, the sleeve 30 preferably being surrounded by an enlarged depending portion 38 of the device 36 in order that both the sleeve 30 and the interlocked upper ends of the standards 12 be concealed so as to present a finished and neat appearance. The depending portion 38 can have any suitable cross-sectional configuration, for example round as indicated in FIGURE 1 or triangular as indicated in FIGURES 2 and 7–9. Each portion will also include a plate 39 closing the upper end thereof.

The hook 22 projecting outwardly from the outer end of the panel 14 is specifically provided for the attachment thereto of an elongated strip 40 which can function either or both as a decorative strip and a boundary indicator. This strip 40, preferably formed of plastic or thin metal, is to be preferably of a generally flexible nature in order that it might be twisted throughout the length thereof as will be best appreciated from the enlarged views of FIGURES 4 and 5. The strip 40 is secured to the corresponding hook 22 by reversely bending the end portion 42 thereof and affixing a resilient spring clip 44 in a manner so as to clamp the reversed end portion 42 to the adjacent portion of the strip 40.

In order to both support the strip 40 at intermediate points, and simultaneously provide further decorative effects, a plurality of intermediate posts 46 are provided, these posts 46 having a pointed lower end 48 acting as an anchor means, and a perpendicularly projecting foot engaging lug 50 for use in inserting the anchor portion 48 into the ground and also acting as both a limit to the insertion of the anchor 48 and as a means for stabilizing the posts 46 in an upright position. The posts 46, when erected, are to have the upper ends 52 thereof at substantially the same height as the hook 22, this upper end 52 of each post 46 having a transverse slot 54 therethrough of a size so as to snugly receive the strip 40 in a manner so as to position the upper edge of the strip 40 flush with the extreme upper end of the posts 46. The strip 40 is fixed within the slot 54 by means of a decorative top 56 having a depending hollow sleeve 58 which in turn is provided with a pair of opposed slots 60 which receive the strip 40 on opposite sides of the posts 46 when the sleeve portion 58 is engaged over the upper end 52 in a relatively tight frictional manner. It will of course be appreciated that the decorative element 56 can be of any suitable type, preferably complementing the decorative devices used in conjunction with the main unit 10.

From the foregoing, it will now be appreciated that an extremely versatile device has been defined, this device incorporating a plurality of elements and unique means for interconnecting the elements in a manner so as to achieve any of a number of different relationships between the elements as might be considered desirable. The particular advantages of the instant invention are basically obtained through the provision of novel end units and novel intermediate units connected thereto by elongated strips, along with simple though highly unique means utilized to interconnect the end units, two or more, at any angle relative to each other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

A lawn decoration comprising a plurality of juxtaposed similar upright tubular standards, a panel fixed to each standard and projecting outwardly therefrom, a hollow elongated sleeve engaged over and interlocking the upper ends of said standards, said sleeve having a cross-sectional configuration the same as and slightly larger than that of one of the standards, said sleeve having a plurality of slots extending upwardly from the lower end thereof and terminating short of the upper end thereof, thereby forming spaced tongue-like portions, each of said slots being of a size so as to slidably receive the wall portions of two adjacent standards upon introduction of the two tongue-like portions adjacent the slots into the ends of the two adjacent standards, a depending wall surrounding said sleeve and spaced outwardly therefrom a distance sufficient so as to enclose the interlocked upper ends of the standards, said standards and sleeve being cylindrical in shape, said sleeve having three slots so as to accommodate either two or three adjacent standards, each panel including a rigid earth engaging means depending from the outer end thereof, a rigid flat base bar extending between and fixed to the corresponding standard and the outer end of the panel, an upwardly projecting ornament mounting stub on each panel adjacent the outer end thereof, an elongated strip-like member secured to each panel and projecting longitudinally therefrom, and a plurality of spaced posts in longitudinal alignment with and positioned outwardly from each panel, said posts being shorter than said standards and having narrow slots through the upper end thereof, said strip-like member being positioned within the post slots, and means removably engaged over the upper portion of each post locking the strip-like member in the slot.

References Cited by the Examiner

UNITED STATES PATENTS

| | | | |
|---|---|---|---|
| 88,819 | 4/1869 | Stanford | 256—27 |
| 199,651 | 1/1878 | Kinney | 256—21 |
| 207,518 | 8/1878 | Hayden | 256—32 |
| 595,600 | 12/1897 | Buck | 256—47 |
| 671,021 | 4/1901 | Jackson | 256—35 |
| 803,741 | 11/1905 | Carlson | 256—21 |
| 966,969 | 8/1910 | Webb | 256—35 |
| 1,086,441 | 2/1914 | Colvin | 256—35 |
| 1,956,662 | 5/1934 | Wolcott | 248—165 |
| 2,258,560 | 10/1941 | Trunzer | 189—23 X |
| 2,715,017 | 8/1955 | Weimer | 189—23 X |
| 2,872,161 | 2/1959 | Olson | 256—24 |
| 2,895,528 | 7/1959 | Steinhauer | 189—29 X |
| 2,966,228 | 12/1960 | Kowalski et al. | 182—178 |
| 3,002,493 | 10/1961 | Galamba | 256—59 X |
| 3,020,023 | 2/1962 | MacIntyre et al. | 256—24 |
| 3,062,494 | 11/1962 | French | 248—431 |

FOREIGN PATENTS

| | | |
|---|---|---|
| 128,568 | 8/1948 | Australia. |
| 164,091 | 3/1955 | Australia. |
| 734,057 | 7/1955 | Great Britain. |

HARRISON R. MOSELEY, *Primary Examiner.*

REINALDO P. MACHADO, *Examiner.*

C. S. KAIMAN, D. L. TAYLOR, *Assistant Examiners.*